(12) United States Patent
Park

(10) Patent No.: US 7,305,521 B2
(45) Date of Patent: Dec. 4, 2007

(54) METHODS, CIRCUITS, AND SYSTEMS FOR UTILIZING IDLE TIME IN DYNAMIC FREQUENCY SCALING CACHE MEMORIES

(75) Inventor: Gi-ho Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 276 days.

(21) Appl. No.: 10/801,893

(22) Filed: Mar. 16, 2004

(65) Prior Publication Data

US 2005/0015553 A1 Jan. 20, 2005

(30) Foreign Application Priority Data

Jul. 14, 2003 (KR) .................... 10-2003-0047719

(51) Int. Cl.
*G06F 12/00* (2006.01)

(52) U.S. Cl. ........................................ 711/118; 711/128

(58) Field of Classification Search .................... None
See application file for complete search history.

(56) References Cited

U.S. PATENT DOCUMENTS

| 4,137,563 | A |   | 1/1979 | Tsunoda |         |
|-----------|---|---|--------|---------|---------|
| 5,860,127 | A |   | 1/1999 | Shimazaki et al. | |
| 5,920,888 | A | * | 7/1999 | Shirotori et al. | 711/128 |
| 5,924,116 | A | * | 7/1999 | Aggarwal et al. | 711/122 |
| 6,385,699 | B1| * | 5/2002 | Bozman et al. | 711/133 |
| 6,631,454 | B1| * | 10/2003 | Sager | 711/167 |
| 7,028,196 | B2| * | 4/2006 | Soltis et al. | 713/300 |
| 2001/0011356 | A1 | | 8/2001 | Lee et al. | |

FOREIGN PATENT DOCUMENTS

| GB | 2260628   | 4/1993 |
| GB | 2260628 A | 4/1993 |

OTHER PUBLICATIONS

United Kingdom Search Report Under Section 17, United Kingdom Application No. GB0415751.7, Nov. 11, 2004.
Puttaswamy et al., "System Level Power-Performance Trade-Offs in Embedded Systems Using Voltage and Frequency Scaling of Off-Chip Buses and Memory," *15th International Symposium on System Synthesis*. pp. 225-230 (Oct. 2-4, 2002).
Great Britain Search Report; Application No. GB2260628; May 19, 2006.

(Continued)

*Primary Examiner*—T Nguyen
(74) *Attorney, Agent, or Firm*—Myers Bigel Sibley & Sajovec, P.A.

(57) ABSTRACT

Dynamic Frequency Scaling (DFS) cache memories that can be accessed during an idle time in a single low frequency DFS clock cycle are disclosed. The access can begin during the idle time in the single low frequency DFS clock cycle and may continue during a subsequent low frequency DFS clock cycle. The idle time can be a time interval in the single low frequency DFS clock cycle between completion of a single high frequency DFS clock cycle and completion of the single low frequency DFS clock cycle. Related circuits and systems are also disclosed.

14 Claims, 6 Drawing Sheets

OTHER PUBLICATIONS

Combined Search and Examination Report for GB0614960.3; date of mailing Sep. 7, 2006.

Ghose et al. "Reducing Power in Superscalar Processor Caches Using Subbanking, Multiple Line Buffers and Bit-Line Segmentation" *Proceedings Of The 1999 International Symposium On Low Power Electronics And Design* pp. 70-75 (1999).

Hennessy et al. *Computer Architecture: A Quantitative Approach*, 3rd Edition, chapter 3.11 "Another View: Thread-Level Parallelism" Morgan Kaufmann Publishers, San Francisco, CA (2003).

Kin et al. "The Filter Cache: An Energy Efficient Memory Structure" *Proceedings of the Thirtieth Annual IEEE/ACM International Symposium on Microarchitecture*, pp. 184-193, (1997).

* cited by examiner

METHODS, CIRCUITS, AND SYSTEMS FOR UTILIZING IDLE TIME IN DYNAMIC FREQUENCY SCALING CACHE MEMORIES

CLAIM FOR PRIORITY

This application claims priority to Korean Application No. 2003-0047719 filed Jul. 14, 2003, the entirety of which is incorporated herein by reference.

FIELD OF THE INVENTION

The invention relates to computer processor architecture in general, and more particularly to cache memory systems, circuits, and methods of operating cache memory systems.

BACKGROUND

It is known that the design of processor systems involves a tradeoff between performance and power dissipation. In particular, processor design can involve efforts to maximize performance while limiting the power dissipated by the processor. This tradeoff can be particularly important when designing processors for use in mobile applications (such as laptop computers), where power may be provided by a battery having very limited capacity.

Processors typically include on-chip cache memories that can significantly increase the performance of the processor. The inclusion of on-chip cache memories also can increase the power dissipated by the processor for at least three reasons. One of the reasons that on-chip cache memories increase processor power dissipation, is that on chip cache memories are typically implemented as static random access memories to provide fast access to the tag and data information stored therein. As is well known to those skilled in the art, static random access memories can dissipate significantly greater power than equivalent dynamic random access memories. Another reason that on-chip cache memories increase processor power dissipation is that the transistors which make up the on-chip cache memory can be spaced closely together thereby increasing the amount of power per unit area that is dissipated by the processor. Still another reason that on-chip cache memories increase processor power dissipation is that on-chip cache memories can be frequently accessed (for example, during the processor's instruction cycle).

A number of approaches have been used in attempts to reduce the power dissipation associated with on-chip cache memories. For example, some systems have employed the use of multiple line buffers to reduce the power dissipated by processor cache memory. Such approaches are discussed, for example, in *Reducing Power In Super scalar Processor Caches Using Subbanking, Multiple Line Buffers and Bit-Line Segmentation* by Ghose et al., Department of Computer Science, State University of New York, Binghamton, N.Y. 13902-6000 ACM1-58113-133-X/99/0008, the disclosure of which is included herein by reference.

Other approaches have employed the use of filter caches to reduce power dissipation in processor cache memory. Such approaches are discuss, for example, in *The Filter Cache: An Energy Efficient Memory Structure* by Kin et al., The Department of Electrical Engineering, UCLA Electrical Engineering, 1997, IEEE 1072-4451/97, the disclosure of which is included herein by reference.

Other approaches have focused on cache memories that operate in a high speed mode and a low speed mode. Such approaches are discussed, for example, in U.S. Pat. No. 5,920,888 to Shirotiro et al., the disclosure of which is included herein by reference.

It is also known to use what is commonly referred to as "dynamic frequency scaling" to change the clock provided to the cache memory, so that the cache memory operates in a low frequency/low power mode to reduce the power dissipated by the cache memory when in the low frequency mode.

SUMMARY

Embodiments according to the invention can provide methods, circuits, and systems for utilizing idle time is dynamic frequency scaling cache memories. Pursuant to these embodiments, a DFS cache memory is accessed during an idle time in a single low frequency DFS clock cycle. In some embodiments according to the invention, the access can begin during the idle time in the single low frequency DFS clock cycle (and continue during subsequent low frequency DFS clock cycle(s)). In some embodiments according to the invention, the idle time is a time interval in the single low frequency DFS clock cycle between completion of a single high frequency DFS clock cycle and completion of the single low frequency DFS clock cycle.

In some embodiments according to the invention, a first DFS cache memory is accessed at a first time in the single low frequency DFS clock cycle and a second DFS cache memory is accessed at a second time in the single low frequency DFS clock cycle responsive to a miss on accessing the first DFS cache memory. In some embodiments according to the invention, a DFS line buffer cache memory is accessed at a first time in the single low frequency DFS clock cycle prior to the idle time and the DFS cache memory is accessed during the idle time in the single low frequency DFS clock cycle responsive to a miss accessing the DFS line buffer cache memory.

In some embodiments according to the invention, a DFS filter cache memory is accessed at a first time in the single low frequency DFS clock cycle and a DFS cache memory is accessed during the idle time in the single low frequency DFS clock cycle responsive to a miss accessing the DFS filter cache memory. In some embodiments according to the invention, the single low frequency DFS clock cycle is a time interval between two time adjacent rising or falling DFS clock edges having no intervening DFS clock edges.

In some embodiments according to the invention, the DFS cache memory is a cache memory configured to operate using a first clock signal having a first frequency in a first mode and configured to operate using a second clock signal have a second frequency that is less than the first frequency in a second mode. In some embodiments according to the invention, the first mode is a high frequency mode and the second mode is a low frequency mode that uses a lower frequency clock than the high frequency mode.

In some embodiments according to the invention, a DFS line buffer cache memory is accessed at a first time in a single low frequency DFS clock cycle. A DFS filter cache memory is accessed at a second time in a single low frequency DFS clock cycle responsive to a miss on accessing the DFS line buffer cache memory. A DFS cache memory is accessed at a third time in the single low frequency DFS clock cycle responsive to a miss on accessing the DFS filter cache memory.

DESCRIPTION OF EMBODIMENTS ACCORDING TO THE INVENTION

Figure 1:
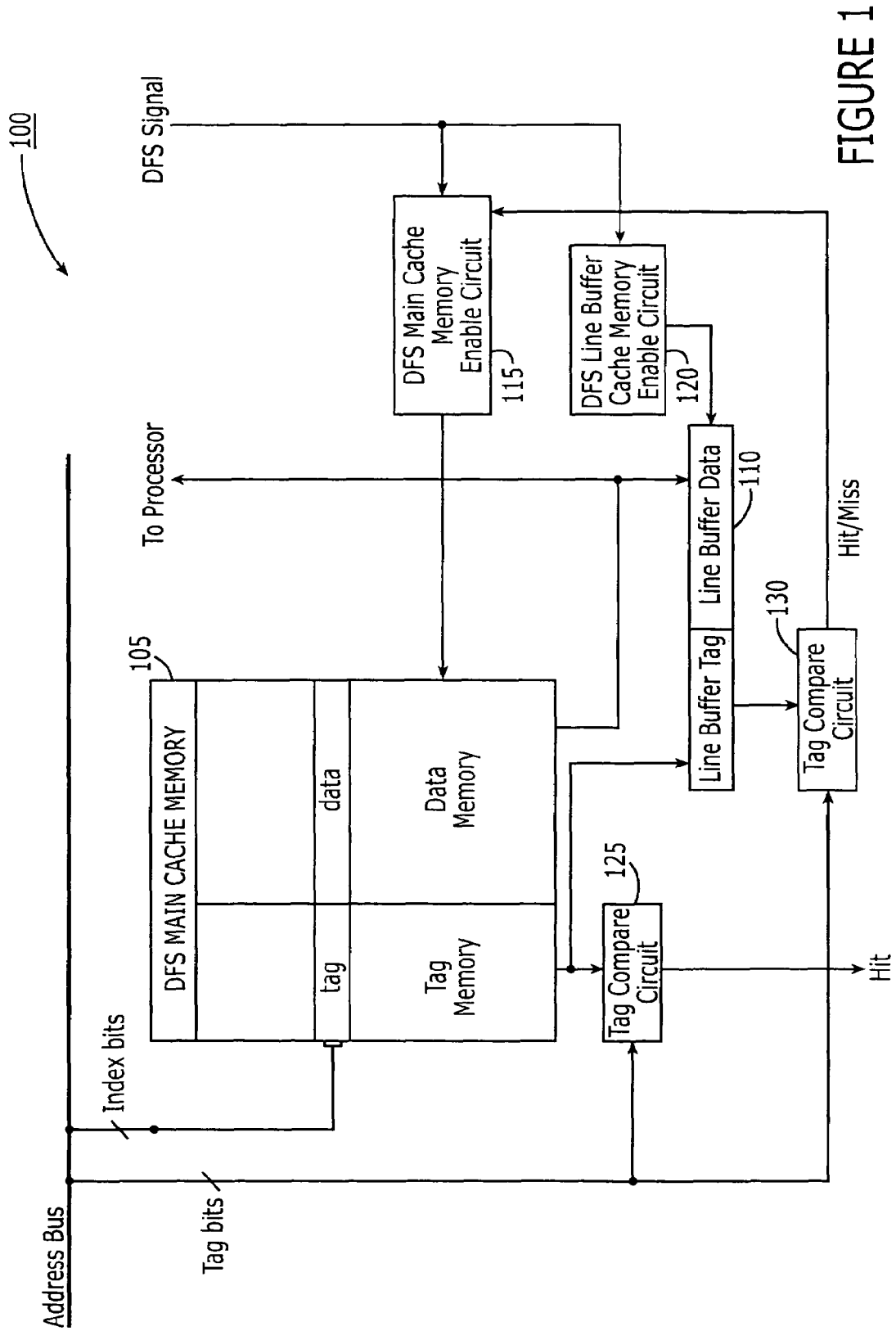
FIG. 1 is a block diagram of a Dynamic frequency Scaling (DFS) cache memory system according to some embodiments of the invention.

The invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete and will fully convey the concept of the invention to those skilled in the art. Like numbers refer to like elements throughout.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

As will be appreciated by one of skill in the art, the present invention may be embodied as methods, cache memory circuits, systems and/or computer program products. Accordingly, the invention may take the form of hardware embodiments, software embodiments or embodiments that combine software and hardware aspects.

The present invention is disclosed using (block and flowchart) diagrams. It will be understood that each block (of the flowchart illustration and block diagrams), and combinations of blocks, can be implemented using computer program instructions. These program instructions may be provided to, for example, a cache memory circuit(s), such that the instructions which cause the cache memory circuit to create means for implementing the functions specified in the block or blocks.

The computer program instructions may be executed by a processor circuit(s), to cause a series of operational steps to be performed by the processor circuit(s) to produce a computer implemented process such that the instructions which execute on the processor circuit(s) provide steps for implementing the functions specified in the block or blocks. Accordingly, the blocks support combinations of means for performing the specified functions, combinations of steps for performing the specified functions and program instructions for performing the specified functions. It will also be understood that each block, and combinations of blocks, can be implemented by special purpose hardware-based systems which perform the specified functions or steps, or combinations of special purpose hardware and computer instructions.

Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program "code" or instructions for carrying out operations according to the present invention may be written in an object oriented programming language such as JAVA®, or in various other programming languages. Software embodiments of the present invention do not depend on implementation with a particular programming language.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the diagram block or blocks.

Embodiments according to the invention can allow a Dynamic Frequency scaling (DFS) main cache memory to be accessed in an otherwise idle time included in a single low frequency DFS clock cycle. In conventional systems, the idle time may be left unused as the DFS main cache memory may be either accessed during an initial portion of the single low frequency clock cycle or during a subsequent low frequency DFS clock cycle. For example, in some embodiments according the invention, a DFS cache memory system include a DFS line buffer cache memory and a DFS main cache memory. The DFS line buffer cache memory is accessed during the initial portion of the single low frequency DFS clock-cycle whereas the DFS main cache memory is accessed during the idle time responsive to a miss when accessing the DFS line buffer cache memory when dynamic frequency scaling is activated.

In other embodiments according to the invention, a DFS filter cache memory is accessed during the initial portion of the single low frequency DFS clock cycle and the DFS main cache memory is accessed during the idle time responsive to a miss on the access to the DFS filter cache memory when dynamic frequency scaling is activated. Embodiments according to the invention can therefore provide the same cache memory system performance as in conventional system but at a reduced power dissipation. Embodiments according to the invention may also provide higher performance than conventional cache memory systems.

FIG. 1 is a block diagram that illustrates a Dynamic Frequency Scaling (DFS) cache memory system 100 according to some embodiments of the invention. The DFS cache memory system 100 is configured to operate in two modes: a high frequency DFS mode and a low frequency DFS mode. The mode of operation for the DFS cache memory system 100 is selected by the state of a DFS signal. In particular, when the DFS signal is in an "on state", the DFS cache memory system 100 operates in the DFS low frequency mode whereas when the DFS signal is in an "off state", the DFS cache memory system 100 operates in the DFS high frequency mode. In embodiments according to the invention, the state of the DFS signal controls which of the cache memories included in the DFS cache memory system 100 are enabled during a DFS clock cycle.

The DFS cache memory system 100 includes a DFS main cache memory 105 that is configured to store tag and data information that is associated with tag information. As is well known to those skilled in the art, the tag information can uniquely identify associated data information stored in the DFS main cache memory 105.

In operation, a processor can access tag and data information by providing index bits to the DFS main cache memory 105 via an address bus. The access causes the corresponding tag information to be read from the DFS main cache memory 105. A DFS main cache tag compare circuit 125 is configured to compare the tag information read from the DFS main cache memory 105 to tag bits included with the address provided by the processor. If the tag information read from the DFS main cache memory 105 matches the tag bits included in the address provided by the processor, a hit occurs. If a hit occurs in the DFS main cache memory 105 the data corresponding to the accessed tag information can be transferred to the processor that requested the data. In contrast, if the tag bits and the accessed tag information do not match, a miss occurs whereupon the requested data may be fetched from a lower level memory device, for example, a lower level cache memory, a main memory or other backing store.

As shown in FIG. 1, the DFS main cache memory 105 further includes a DFS line buffer cache memory 110 that is configured to store line buffer tag and data information that can reflect one or more entries included in the DFS main cache memory 105. For example, as is well understood by those having skill in the art, data and tag information stored in the DFS main cache memory 105 can be copied to the DFS line buffer cache memory 110 in anticipation of a future request for the copied data. Placing the tag and data information into the DFS line buffer cache memory 110 can avoid the need to access the DFS main cache memory 105, which may consume less power. The DFS cache memory system 100 can also replace the tag and data information stored in the DFS line buffer cache memory 110 with other tag and data information stored in the DFS main cache memory 105 when, for example, it is determined that the data information stored in the DFS line buffer cache memory 110 is no loner valid.

The DFS line buffer cache memory 110 can be accessed in a similar fashion to that described above with reference to the DFS main cache memory 105. In particular, the tag bits included with the address are provided to a DFS line buffer tag compare circuit 130 that compares the tag bits to line buffer tag information stored in DFS line buffer cache memory 110. If the tag bits match the line buffer tag information, a hit occurs. If a hit occurs on the access to the DFS line buffer cache memory 110, the line buffer information stored in the DFS line buffer cache memory 110 can be provided to the processor that requested the data. If, on the other hand, the tag bits do not match the line buffer tag information, a miss occurs.

A DFS main cache memory enable circuit 115 can control access to the DFS main cache memory 105 based on the state of the DFS signal and whether a hit or miss occurred on an access to the DFS line buffer cache memory 110. In particular, when the DFS signal is in the on state (indicating that low frequency DFS mode is enabled) the DFS main cache memory enable circuit 115 enables access to the DFS main cache memory 105 responsive to a miss occurring on an access to the DFS line buffer cache memory 110. If on the other hand, when an access to the DFS line buffer cache memory 110 results in a hit, the DFS main cache memory enable circuit 115 disables access to the DFS main cache memory 105. It will be further understood that the DFS main cache memory enable circuit 115 is configured to disable access to the DFS main cache memory 105 when the DFS signal is in the off state.

A DFS line buffer cache memory enable circuit 120 controls whether the DFS line buffer cache memory 110 can be accessed based on the state of the DFS signal. In particular, the DFS line buffer cache memory enable circuit 120 is configured to enable the DFS line buffer cache memory 110 when the DFS signal is in the on state (indicating that the low frequency DFS mode is enabled). Accordingly, in the low frequency DFS mode, the DFS line buffer cache memory enable circuit 120 enables an access to the DFS line buffer cache memory so the DFS line buffer tag compare circuit 130 can determine whether the DFS line buffer memory 110 includes the requested data associated with the tag bits on the address bus. If a hit occurs, the line buffer data information stored in the DFS line buffer cache memory 110 can be provided to the processor. It will also be understood that when the DFS signal is in the off state (indicating that the high frequency DFS mode is enabled) the DFS line buffer cache memory circuit 120 disables access to the DFS line buffer cache memory 110.

Accordingly, in some embodiments according to the invention, in low frequency DFS mode the DFS line buffer cache memory 110 is enabled so that an initial access may be made to determine whether the requested data is stored therein. If a miss occurs on the access to the DFS line buffer cache memory 110, the DFS main cache memory enable circuit 115 enables access to the DFS main cache memory 105 to replace the tag and data information stored in the DFS line buffer cache memory 110 with other tag and data information stored in the DFS main cache memory 105. Moreover, the access to the DFS main cache memory 105 can be performed during an otherwise idle time of a single low frequency DFS clock cycle.

Figure 2:
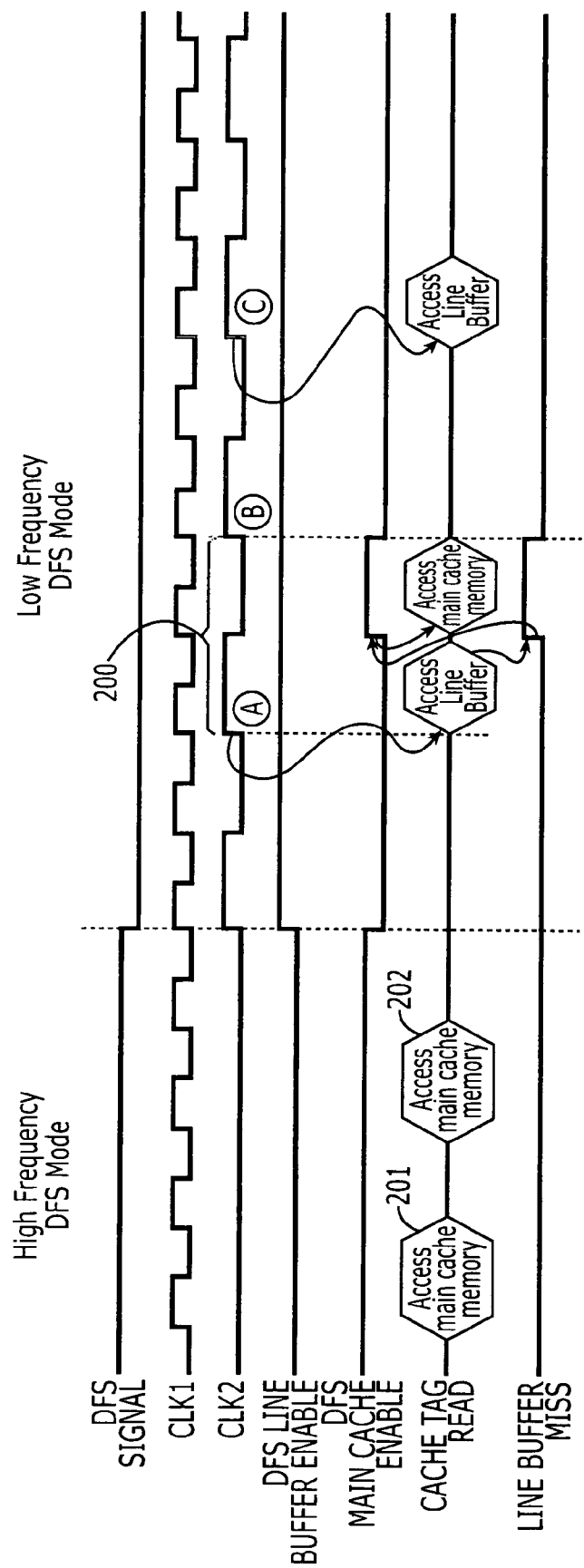
FIG. 2 is a timing diagram illustrating operations of a DFS cache memory system according to some embodiments of the invention.

FIG. 2 is a timing diagram that illustrates operations of a DFS cache memory system according to some embodiments of the invention. As shown in FIG. 2, when the DFS signal is "high", the high frequency DFS mode is enabled, whereas when the DFS signal is "low", the low frequency DFS mode is enabled. In the high frequency DFS mode, CLK1 is used to operate the DFS main cache memory 105 and the DFS line buffer cache memory 110 (as well as other ancillary logic associated therewith). In the low frequency DFS mode, CLK2 is used to operate the DFS main cache memory 105 and the DFS line buffer cache memory 110 (as well as the ancillary logic associated therewith). It will be understood that although the CLK2 is shown in FIG. 2 as having a period that is about twice that of CLK1, other periods may be used. Furthermore, the period of CLK2 may be defined to include a whole number of cycles of CLK1 or fractions of whole cycles.

It will also be understood that although the CLK2 is shown in FIG. 2 as starting synchronous with CLK1, a DFS switching time interval may be used to begin use of CLK2 where irregular clock behavior may be exhibited. Furthermore, the timing relationship between CLK1 and CLK2 may be provided dynamically. For example, during an initial period of the DFS switching time interval, CLK1 and CLK2 may be essentially identical whereupon CLK2 is changed over time to provide the relationship shown in FIG. 2 (or another relationship according to embodiments of the invention). Furthermore, in some embodiments according to the invention, CLK1 (or some versions thereof provided to the DFS cache memory system) may cease operation during the low frequency DFS mode.

As discussed above in reference to FIG. 1, during the high frequency DFS mode, access to the DFS line buffer cache memory 110 is disabled by the DFS line buffer cache memory enable circuit 120, whereas accesses to the DFS main cache memory 105 are enabled by the DFS main cache memory enable circuit 115. Accordingly, in FIG. 2 when the DFS signal is high, accesses 201 and 202 by the processor to the DFS cache memory system 100 are performed by accessing the DFS main cache memory 105.

In the low frequency DFS mode of operation, the DFS line buffer cache memory enable circuit 120 enables initial access to DFS line buffer cache memory 110 using a line buffer enable signal shown in FIG. 2. In particular, the DFS line buffer cache memory 110 is accessed on a rising edge of CLK2 at a time A during an initial portion of a single low frequency DFS clock cycle 200. If the access to the DFS line buffer cache memory 110 results in a miss, a DFS Line Buffer Miss signal is activated, whereupon the DFS main cache enable circuit 115 enables an access to the DFS main cache memory 105 using a DFS Main Cache enable signal.

As shown in FIG. 2, the access to the DFS main cache memory 105 may terminate on the next edge of the single low frequency DFS clock cycle 200 at a time B. In some embodiments according to the invention, the access to the DFS main cache memory 105 may continue into a subsequent single low frequency DFS clock cycle. Accordingly, the access to the DFS main cache memory 105 can be performed during an otherwise idle time in the single low frequency DFS clock cycle 200. For example, in some conventional cache memory systems, in low frequency DFS mode, both a preliminary access to a conventional line buffer and an access to a conventional main cache are carried out during the initial portion of the single low frequency DFS clock cycle. Therefore, some embodiments according to the invention can provide reduced power relative to conventional systems while incurring no additional delay as the access can be completed by the next edge of the DFS clock cycle.

It will be understood that the idle time can be defined as a time interval in the single low frequency DFS clock cycle between completion of a single high frequency DFS clock cycle and completion of the single low frequency DFS clock cycle. For example, according to FIG. 2, an idle time included in the single low frequency DFS clock cycle 200 can be defined to be the time interval between the completion of the single high frequency DFS clock cycle that occurs during the initial portion of the single low frequency DFS clock cycle 200 and the completion of the single low frequency DFS clock cycle 200. In other words, the time can be the latter half of the single low frequency DFS clock cycle 200.

Referring again to FIG. 2, if an access to the DFS line buffer cache memory 110 results in a hit at a time C, the DFS main cache memory enable circuit 115 disables access to the DFS main cache memory 105 thereby avoiding the power consumption associated with an access to the DFS main cache memory 105. Accordingly, in cases where a hit occurs on an access to the DFS line buffer cache memory 110 during low frequency DFS mode, the access to the DFS main cache memory 105 may be avoided.

Figure 3:
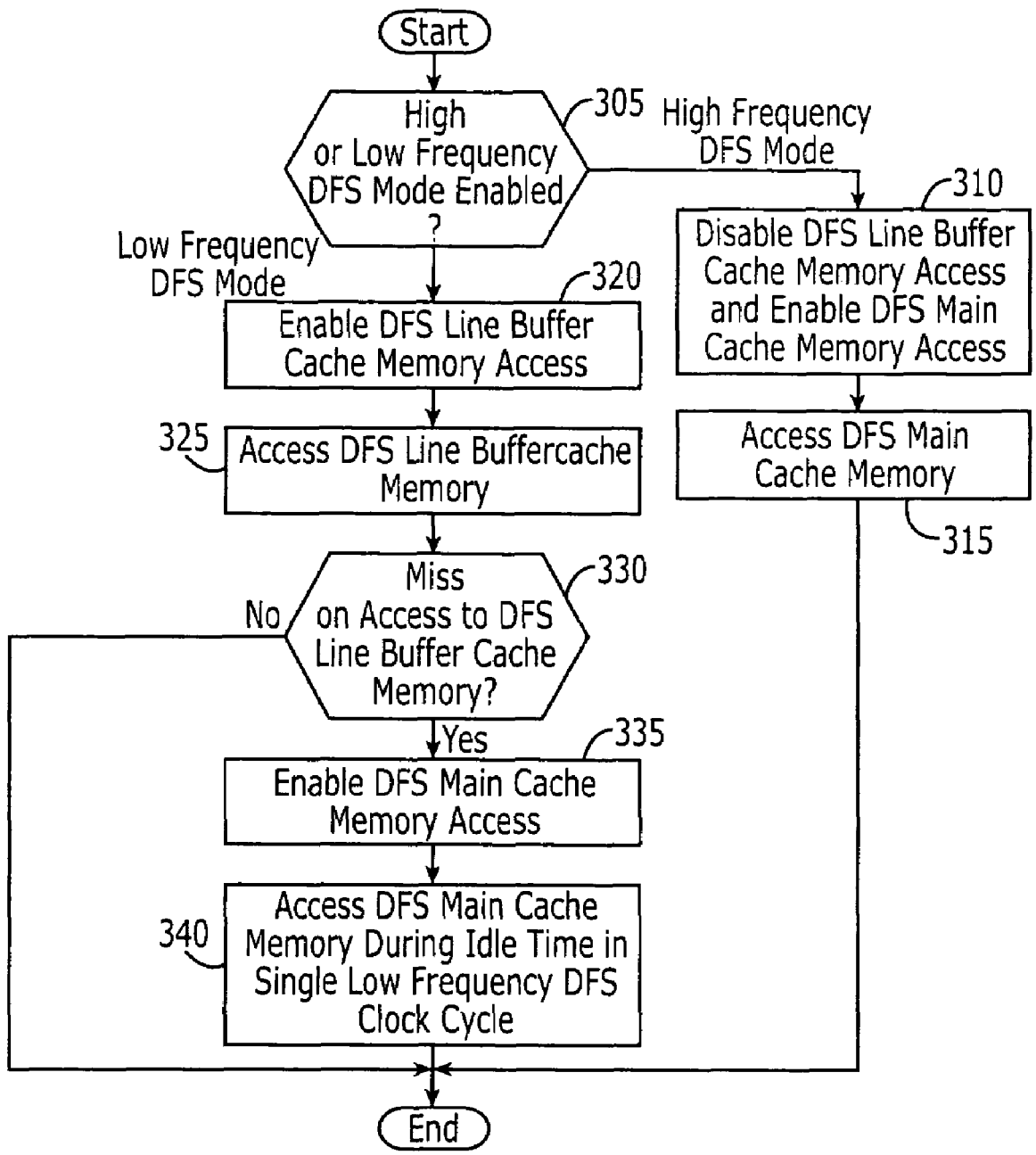
FIG. 3 is a flow chart that illustrates operations of a DFS cache memory system according to some embodiments of the inventions.

FIG. 3 is a flowchart-that illustrates operations of a DFS cache memory system according to some embodiments of the invention. As shown in FIG. 3, if the DFS cache memory system is operating in high frequency mode (block 305), access to the DFS line buffer cache memory is disabled and access to the DFS main cache memory is enable (block 310). The DFS main cache memory is accessed to determine whether the requested data is contained therein (block 315). If however the DFS cache memory system is operating in the low frequency DFS mode (block 305), access to the DFS line buffer cache memory is enabled (block 320) and an access to the DFS line buffer cache memory is performed (block 325). If the access to the DFS line buffer cache memory results in a hit (i.e. no miss) (block 330), the data contained within the DFS line buffer cache memory is provided to the processor. If however the access to the DFS line buffer cache memory causes a miss (block 330), access to the DFS main cache memory is enabled (block 335) and an access to the DFS main cache memory is performed during an idle time in the single low frequency DFS clock cycle (block 340).

Figure 4:
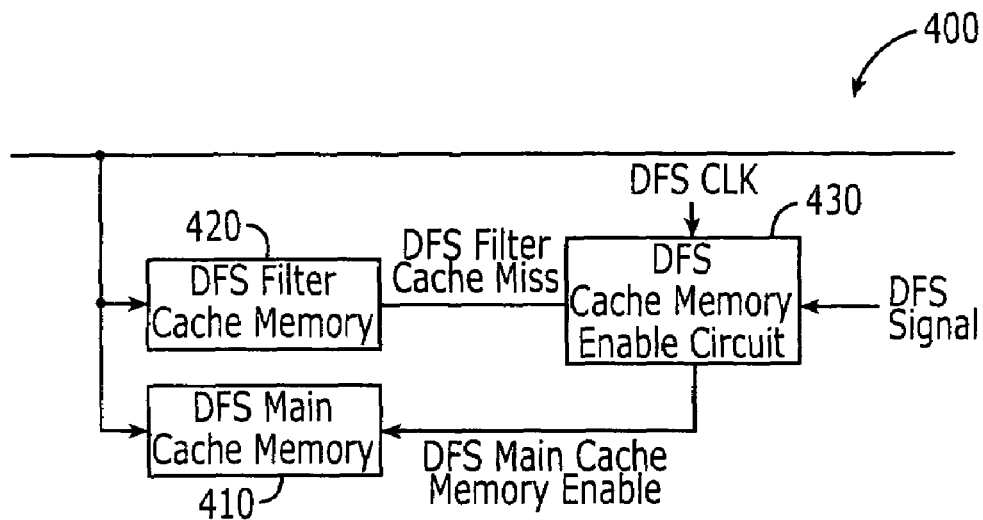
FIG. 4 is a block diagram that illustrates a DFS cache memory system according to some embodiments in the invention.

FIG. 4 is a block diagram that illustrates a DFS cache memory system 400 according to some embodiments of the invention. In particular, the DFS cache memory system 400 includes a DFS main cache memory 410 that operates in a similar fashion to that discussed above in reference to FIGS. 1-3. The DFS cache memory system 400 also includes a DFS filter cache memory filter 420 that can be accessed in advance of accessing the DFS main cache memory 410.

A DFS main cache memory enable circuit 430 is configured to enable the DFS main cache memory 410 based on the state of the DFS signal and the result of an access to the DFS filter cache memory 420 represented by a DFS Filter Cache Miss signal. In particular, if the access to the DFS filter cache memory 420 results in a miss when operating in the high frequency DFS mode, the DFS main cache memory enable circuit 430 enables the DFS main cache memory 410 (via the DFS Main Cache Memory Enable signal) synchronous with the next edge of the (high frequency) DFS clock. If on the other hand, the DFS cache memory system 400 is operating in the low frequency DFS mode, the DFS main cache memory enable circuit 430 generates the DFS Main Cache Memory Enable signal asynchronous to a subsequent edge of the high frequency DFS clock (on a miss on the access to the DFS filter cache memory 410). Accordingly, the DFS cache memory system 400 can access the DFS main cache memory 410 during an otherwise idle portion of the single low frequency DFS clock cycle when operating in low frequency DFS mode.

Figure 5:
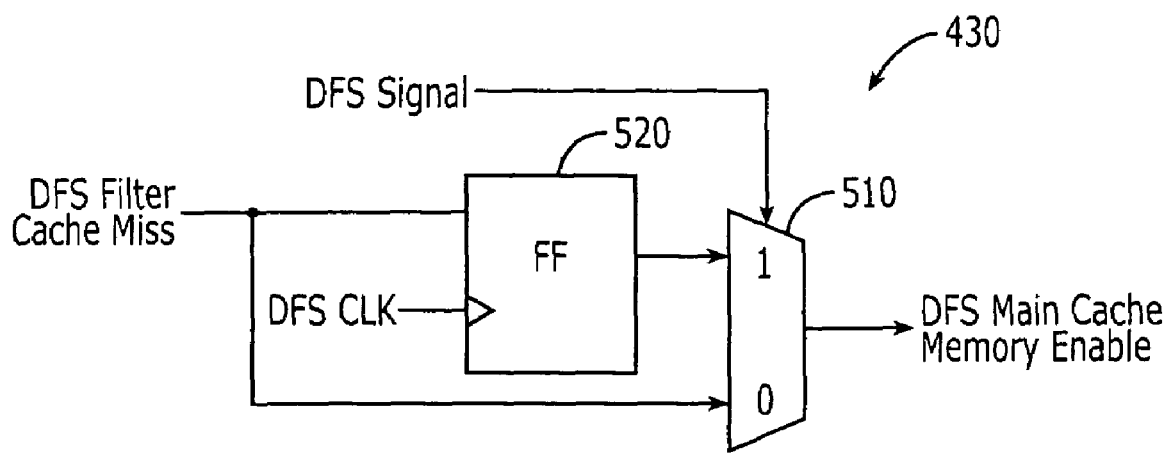
FIG. 5 is a block diagram that illustrates a DFS main cache memory enable circuit according to some embodiments of the invention.

FIG. 5 is a schematic diagram that illustrates a DFS main cache memory enable circuit 430 according to some embodiments of the invention. In particular, the DFS main cache memory enable circuit 430 includes a multiplexer 510 responsive to the DFS signal to select a synchronized or unsynchronized version of a result of the access to the DFS filter cache memory (i.e., DFS Filter Cache Miss signal). The synchronized version of the DFS Filter Cache Miss signal is provided by a storage element 520 that is clocked by a DFS clock signal and provided to an input of the multiplexer 510. The unsynchronized version of the DFS Filter Cache Miss signal is provided directly to the other input of the multiplexer 510. When the DFS main cache memory enable circuit 430 operates in the high frequency DFS mode, the multiplexer 510 selects the synchronized version of the DFS Filter Cache Miss signal on the next edge of the (high frequency) DFS clock so that the enable to the DFS main cache memory 410 begins at the next high frequency DFS clock cycle. In contrast, when the DFS main cache memory enable circuit 430 operates in the low frequency DFS mode, the unsynchronized version of the DFS Filter Cache Miss signal is selected by the multiplexer 510, which is provided in turn to the DFS main cache memory 410 during an otherwise idle time of the single low frequency DFS clock cycle (i.e. before the next low frequency DFS clock transition begins the subsequent low frequency DFS clock cycle).

Figure 6:
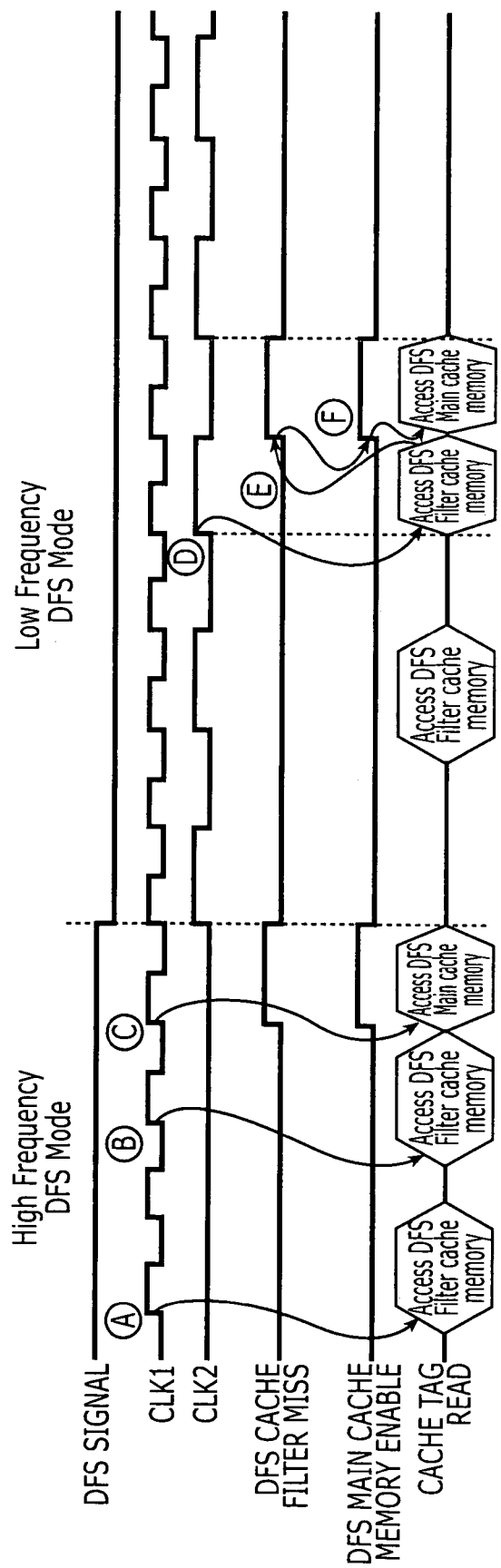
FIG. 6 is a timing diagram that illustrates operations of a DFS cache memory system according to some embodiments of the invention.

FIG. 6 is a timing diagram that illustrates operations of a DFS cache memory system according to some embodiments of the invention. According to FIG. 6, the DFS cache memory system can operate in a high frequency DFS mode and a low frequency DFS mode based on the state of DFS signal as shown in FIG. 6. Furthermore, when the DFS cache memory system operates in the high frequency DFS mode, the DFS cache memory system operates according to CLK1 whereas when the DFS cache memory system operates in the low frequency DFS mode, the DFS cache memory system operates according to CLK2. As shown in FIG. 6, if an access at a time A to the DFS filter cache memory operating in the high frequency mode results in a hit, no further access to the DFS main cache memory is required. If however an access at time B in the high frequency DFS mode results in a miss on an access to the DFS cache filter memory, the DFS main cache memory is accessed at a time C in a subsequent high frequency DFS clock cycle.

Still referring to FIG. 6, if an access to the DFS cache memory system operating in low frequency DFS Mode at a time D results in a hit in the DFS filter cache, no further access is required if the DFS main memory cache. If however an access to the DFS filter cache memory at time D results in a miss, the DFS Cache Filter Miss signal is asserted at a time E which causes the DFS main cache memory to be enabled at a time F during an otherwise idle time of the single low frequency clock cycle. As discussed above, the DFS Cache Filter Miss signal on a miss in low frequency DFS mode can be provided unsynchronized to the DFS clock so that the otherwise idle time can be utilized to access the DFS Main Cache Memory.

As discussed above, embodiments according to the invention can allow a Dynamic Frequency scaling (DFS) main cache memory to be accessed in an otherwise idle time included in a single low frequency DFS clock cycle. In conventional systems, the idle time may be left unused as the DFS main cache memory may be either accessed during an initial portion of the single low frequency clock cycle or during a subsequent low frequency DFS clock cycle. For example, in some embodiments according the invention, a DFS cache memory system include a DFS line buffer cache memory and a DFS main cache memory. The DFS line buffer cache memory is accessed during the initial portion of the single low frequency DFS clock cycle whereas the DFS main cache memory is accessed during the idle time responsive to a miss when accessing the DFS line buffer cache memory when dynamic frequency scaling is activated.

In other embodiments according to the invention, a DFS filter cache memory is accessed during the initial portion of the single low frequency DFS clock cycle and the DFS main cache memory is accessed during the idle time responsive to a miss on the access to the DFS filter cache memory when dynamic frequency scaling is activated. Embodiments according to the invention can therefore provide the same cache memory system performance as in conventional system but at a reduced power dissipation. Embodiments according to the invention may also provide higher performance than conventional cache memory systems.

Figure 7:
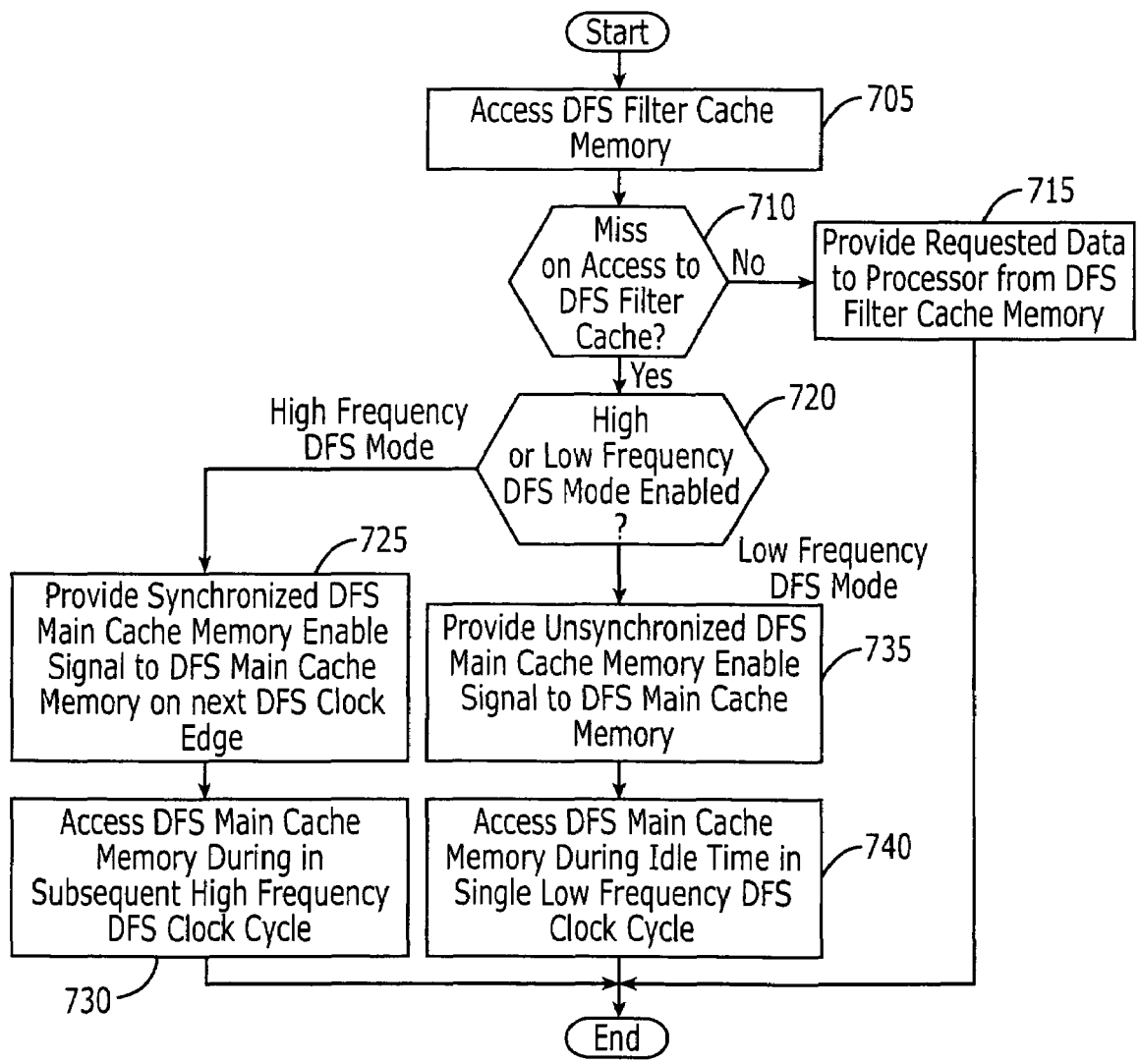
FIG. 7 is a flow chart that illustrates operations of a DFS cache memory system according to some embodiments of the invention.

FIG. 7 is a flowchart that illustrates operations of a DFS cache memory system according to some embodiments of the invention. As shown in FIG. 7, an access is performed to the DFS filter cache memory (block 705). If the access causes a hit (i.e., no miss) (block 710), the requested data is provided to the processor from the DFS filter cache memory (block 715). If however, the access causes a miss (block 710) one of two operations is provided depending on whether low frequency or high frequency DFS mode is enabled (block 720).

If high frequency DFS mode is enabled, a synchronized version of a DFS main cache memory enable signal is provided to the DFS main cache memory on the next DFS clock edge (block 725). The synchronized version of the DFS main cache memory enable signal allows the DFS main cache memory to be accessed during a subsequent high frequency DFS clock cycle (block 730). If, on the other hand, low frequency DFS mode is enabled (block 720), an unsynchronized version of the DFS main cache memory enable signal is provided to the DFS main cache memory (block 735). The unsynchronized version of the DFS main cache memory enable signal allows DFS main cache memory to be accessed during an otherwise idle time in the single low frequency DFS clock cycle (block 740).

Although the aspects of the DFS line buffer cache memory and the DFS filter cache memory described separately above, it will be understood that these aspects may be combined to provide a DFS cache memory system that includes both a DFS line buffer cache memory and a DFS filter cache memory according to embodiments of the invention.

As disclosed herein, in some embodiments according to the invention, a DFS cache memory is accessed during an idle time in a single low frequency DFS clock cycle. In some embodiments according to the invention, the access can begin during the idle time in the single low frequency DFS clock cycle (and continue during subsequent low frequency DFS clock cycle(s)). In some embodiments according to the invention, the idle time is a time interval in the single low frequency DFS clock cycle between completion of a single high frequency DFS clock cycle and completion of the single low frequency DFS clock cycle.

In some embodiments according to the invention, a first DFS cache memory is accessed at a first time in the single low frequency DFS clock cycle and a second DFS cache memory is accessed at a second time in the single low frequency DFS clock cycle responsive to a miss on accessing the first DFS cache memory. In some embodiments according to the invention, a DFS line buffer cache memory is accessed at a first time in the single low frequency DFS clock cycle prior to the idle time and the DFS cache memory is accessed during the idle time in the single low frequency DFS clock cycle responsive to a miss accessing the DFS line buffer cache memory.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method of operating a Dynamic Frequency Scaling (DFS) cache memory including a line buffer DFS cache memory and a DFS main cache memory associated therewith, the method comprising:
   modifying access to the DFS cache memory based on whether the DFS cache memory is operating according to a low frequency DFS clock or a high frequency DFS clock, wherein modifying comprises:
   accessing the DFS main cache memory without accessing the DFS line buffer cache memory when the DFS cache memory is operating according to the high frequency DFS clock; and
   accessing the DFS line buffer cache memory responsive to a miss on accessing the DFS main cache memory when the DFS cache memory is operating according to the low frequency DFS clock.

2. A method according to claim 1 wherein accessing the line buffer DFS cache memory further comprises:
   accessing the DFS line buffer cache memory at a first time in a single low frequency DFS clock cycle of the low frequency DFS clock to determine whether data associated with an address is stored therein; and
   accessing the DFS main cache memory at a second time in the single low frequency DFS clock cycle responsive to determining that the data is not stored in the DFS line buffer cache memory.

3. A method according to claim 2 wherein accessing the DFS line buffer cache memory comprises beginning accessing the DFS line buffer cache memory during the first time in the single low frequency DFS clock cycle.

4. A method according to claim 2 wherein the second time comprises a time interval in the single low frequency DFS clock cycle between completion of a single high frequency DFS clock cycle and completion of the single low frequency DFS clock cycle.

5. A method according to claim 2 wherein the single low frequency DFS clock cycle comprises a time interval between two time adjacent low frequency DFS clock edges having no intervening low frequency DFS clock edges.

6. A Dynamic Frequency Scaling (DFS) cache memory system comprising:
   a line buffer cache memory configured to store line buffer cached tag and data information;
   a line buffer cache memory enable circuit configured to enable access to the line buffer cache memory during an idle time in a single low frequency DFS clock cycle based on the DFS signal in an on state and configured to disable access to the line buffer cache memory based on the DFS signal in an off state;
   a main cache memory configured to store main cached tag and data information; and
   a main cache memory enable circuit configured to disable access to the main cache memory based on a DFS signal in the on state and configured to enable access to the main cache memory during the idle time based on the DFS signal in the on state and a miss on an access to the line buffer cache memory.

7. A DFS cache memory system according to claim 6 wherein the main cache memory enable circuit is further configured to disable access to the main cache memory during the single low frequency DFS clock cycle prior to the idle time.

8. A Dynamic Frequency Scaling (DFS) cache memory system comprising:
   a filter cache memory configured to store filter cached tag and data information;
   a main cache memory configured to store main cached tag and data information; and
   a main cache memory enable circuit configured to enable access to the main cache memory during an idle time in a single low frequency DFS clock cycle based on the DFS signal in the on state and a miss on the access to the filter cache memory and configured to disable access to the main cache memory during the idle time based on the DFS signal in the on state and a hit on the access to the filter cache memory.

9. A DFS cache memory system according to claim 8 wherein the main DFS cache memory is configured to begin access during the idle time in the single low frequency DFS clock cycle.

10. A DFS cache memory system according to claim 8 wherein the idle time comprises a time interval in the single low frequency DFS clock cycle between completion of a single high frequency DFS clock cycle and completion of the single low frequency DFS clock cycle.

11. A DFS cache memory system according to claim 8 wherein the cache memory enable circuit further comprises:
   a storage element circuit configured to store a result of the access to the filter cache memory on a transition of a DFS clock signal at a beginning of the idle time to provide a clocked filter cache hit/miss result; and
   a multiplexer, coupled to the storage element, configured to select the clocked filter cache hit/miss result responsive to the DFS signal in the off state and configured to select the result of the access to the filter cache memory responsive to the DFS signal in the on state to provide a main cache memory enable/disable signal to the main cache memory.

12. A DFS cache memory system according to claim 11 wherein the storage element circuit comprises a flip-flop circuit.

13. A DFS cache memory system according to claim 8 wherein the DFS cache memory comprises a cache memory system configured to operate using a first clock signal having a first frequency in a first mode when the DFS signal is in the off state and configured to operate using a second clock signal have a second frequency that is less than the first frequency in a second mode when the DFS signal is in the on state.

14. A DFS cache memory system according to claim 8 wherein the first mode comprises a high frequency mode and the second mode comprises a low frequency mode.

* * * * *